(12) United States Patent
Littmann et al.

(10) Patent No.: US 9,238,700 B2
(45) Date of Patent: Jan. 19, 2016

(54) PROCESS FOR THE PREPARATION OF ETHYLENE COPOLYMERS IN THE PRESENCE OF FREE-RADICAL POLYMERIZATION INITIATOR BY COPOLYMERIZING ETHYLENE, A BI- OR MULTIFUNCTIONAL COMONOMER AND OPTIONALLY FURTHER COMONOMERS

(75) Inventors: Dieter Littmann, Mucke (DE); Dieter Lilge, Limburgerhof (DE); Barbara Gall, Gunzburg (DE); Iakovos Vittorias, Mainz (DE); Gerd Mannebach, Munstermaifeld (DE); Markus Busch, Riedstadt (DE); Thomas Herrmann, Darmstadt (DE)

(73) Assignee: Basell Polyolefine GmbH, Wesseling (DE)

( * ) Notice: Subject to any disclaimer, the term of this patent is extended or adjusted under 35 U.S.C. 154(b) by 22 days.

(21) Appl. No.: 13/996,415

(22) PCT Filed: Dec. 19, 2011

(86) PCT No.: PCT/EP2011/073196
§ 371 (c)(1),
(2), (4) Date: Jun. 20, 2013

(87) PCT Pub. No.: WO2012/084787
PCT Pub. Date: Jun. 28, 2012

(65) Prior Publication Data
US 2013/0295289 A1    Nov. 7, 2013

Related U.S. Application Data

(60) Provisional application No. 61/531,466, filed on Sep. 6, 2011.

(30) Foreign Application Priority Data

Dec. 22, 2010 (EP) .................................... 10015964

(51) Int. Cl.
*B05D 3/02* (2006.01)
*C08F 210/02* (2006.01)
*C08F 2/38* (2006.01)

(52) U.S. Cl.
CPC ................. *C08F 210/02* (2013.01); *C08F 2/38* (2013.01)

(58) Field of Classification Search
CPC ............ C08F 2/38; C08F 210/02; C08F 2/00; C08F 220/28
USPC ........................................................ 427/384
See application file for complete search history.

(56) References Cited

U.S. PATENT DOCUMENTS 3,300,452 A    1/1967  Waples
5,298,582 A    3/1994  Brusson et al.
(Continued)

FOREIGN PATENT DOCUMENTS

EP    0538033    4/1993

OTHER PUBLICATIONS

PCT International Search Report & Written Opinion mailed Mar. 23, 2012, for PCT/EP2011/073196.

*Primary Examiner* — Robert S Walters, Jr.

(57) ABSTRACT

Process for preparing ethylene copolymers in the presence of free-radical polymerization initiator at pressures in the range of from 160 MPa to 350 MPa and temperatures in the range of from 100° C. to 350° C. in a tubular reactor by copolymerizing ethylene, a bi- or multifunctional comonomer and optionally further comonomers, wherein the bi- or multifunctional comonomer bears at least two different functional groups, of which at least one is a unsaturated group, which can be incorporated into the growing polymer chain, and at least another functional group can act as chain transfer agent in radical ethylene polymerization, ethylene copolymers obtainable by such a process, the use of the ethylene copolymers for extrusion coating and a process for extrusion coating a substrate selected from the group consisting of paper, paperboard, polymeric film, and metal, with such ethylene copolymers.

9 Claims, 2 Drawing Sheets

(56) References Cited

U.S. PATENT DOCUMENTS

| | | |
|---|---|---|
| 2008/0242809 A1 | 10/2008 | Neuteboom et al. |
| 2009/0234082 A1 | 9/2009 | Neilen |
| 2010/0222535 A1 | 9/2010 | Eaton |
| 2013/0237678 A1 * | 9/2013 | Osby et al. .......... 526/298 |

* cited by examiner

PROCESS FOR THE PREPARATION OF ETHYLENE COPOLYMERS IN THE PRESENCE OF FREE-RADICAL POLYMERIZATION INITIATOR BY COPOLYMERIZING ETHYLENE, A BI- OR MULTIFUNCTIONAL COMONOMER AND OPTIONALLY FURTHER COMONOMERS

This application is the U.S. National Phase of PCT International Application PCT/EP2011/073196, filed Dec. 19, 2011, claiming priority of European Patent Application No. 10015964.9, filed Dec. 22, 2010 and the benefit under 35 U.S.C. 119(e) of U.S. Provisional Application No. 61/531,466, filed Sep. 6, 2011, the contents of which are incorporated herein by reference in their entirety.

BACKGROUND

The present invention relates to a process for preparing ethylene copolymers in the presence of free-radical polymerization initiator at pressures in the range of from 160 MPa to 350 MPa and temperatures in the range of from 100° C. to 350° C. in a tubular reactor by copolymerizing ethylene, a bi- or multifunctional comonomer and optionally further comonomers and it further relates to ethylene copolymers obtainable by such a process, to the use of the ethylene copolymers for extrusion coating and to a process for extrusion coating a substrate selected from the group consisting of paper, paperboard, polymeric film, and metal, with such ethylene copolymers.

Polyethylene is the most widely used commercial polymer. It can be prepared by a couple of different processes. Polymerization in the presence of free-radical initiators at elevated pressures was the method first discovered to obtain polyethylene and continues to be a valued process with high commercial relevance for the preparation of low density polyethylene (LDPE). LDPE is a versatile polymer which can be used in a variety of applications, such as film, coating, molding, and wire and cable insulation. There is consequently still demand for optimizing the processes for its preparation.

Common reactors for preparing LDPE polymers at high pressures are either tubular reactors or stirred autoclave reactors. The advantages of polymerizing in a tubular reactor are that higher turnovers can be achieved in the polymerization process, the process is easier to scale-up and it is accordingly possible to build "world-scale" plants and the polymerization is in general more economic because of a lower specific consumption of utilities such as electricity and cooling water. However, the LDPE polymers prepared in a tubular high-pressure reactor have certain disadvantages for some applications. Compared to LDPE polymers of similar melt flow rate (MFR) and density prepared in a high-pressure autoclave LDPE reactor the LDPE polymers prepared in a tubular reactor have in general a narrower molecular weight distribution and a lower amount of long-chain branching (LCB).

An example for an application, in which LDPE prepared in a tubular reactor is inferior to LDPE prepared in an autoclave reactor, is extrusion coating. In this process, the molten LDPE is extruded through a slit-die and casted into a film, which is then coated onto a substrate such as paper, paperboard, a polymeric film like a polyethylenterephthalat (PET) film or a biaxially-oriented polypropylene (BOPP) film, or a metal like an aluminum foil. For a good processability, the LDPE has to show a stable web, i.e. the film casted out of the die shall not oscillate, and a low neck-in is required, i.e. the ratio of the width of the film over the width of the die should not be too low. Furthermore, high processing temperatures of up to 350° C. are required for the post-treatment of the produced polymer film in order to enhance its adhesion properties at substrates such as metal, paper, or paperboard. To fulfill these requirements a certain level of LCB is advantageous.

For providing a LDPE copolymer that enhances the web stability during the extrusion coating process, WO 2006/094723 discloses a process for the preparation of an ethylene copolymer in a tubular reactor, in which ethylene is copolymerized with a di- or higher functional (meth)acrylate. WO 2007/110127 teaches to copolymerize ethylene and a bifunctional α,ω-alkadiene for the same purpose. However, these bi- or higher functional comonomers can only be used in relatively small amounts because otherwise a too high amount of very high-molecular component is produced, corresponding to a high risk of gel formation, especially if these comonomers are not perfectly homogenized in the reaction medium. Furthermore, the tendency for forming LCB is limited.

SUMMARY OF THE INVENTION

Thus, it was the object of the present invention to overcome the disadvantages of LDPE polymers prepared by polymerization in a tubular reactor and provide a possibility to obtain LDPE polymers with an increased amount of long-chain branching in such a reactor.

We have found that this object is achieved by a process for preparing ethylene copolymers in the presence of free-radical polymerization initiator at pressures in the range of from 160 MPa to 350 MPa and temperatures in the range of from 100° C. to 350° C. in a tubular reactor by copolymerizing ethylene, a bi- or multifunctional comonomer and optionally further comonomers, wherein the bi- or multifunctional comonomer bears at least two different functional groups, of which at least one is a unsaturated group, which can be incorporated into the growing polymer chain, and at least another functional group can act as chain transfer agent in radical ethylene polymerization.

Furthermore, we have found ethylene copolymers obtainable by such a process, the use of the ethylene copolymers for extrusion coating and a process for extrusion coating a substrate selected from the group consisting of paper, paperboard, polymeric film, and metal, with such ethylene copolymers.

BRIEF DESCRIPTION OF THE DRAWINGS

The features and advantages of the present invention can be better understood via the following description and the accompanying drawings where.

DETAILED DESCRIPTION

Figure 1:
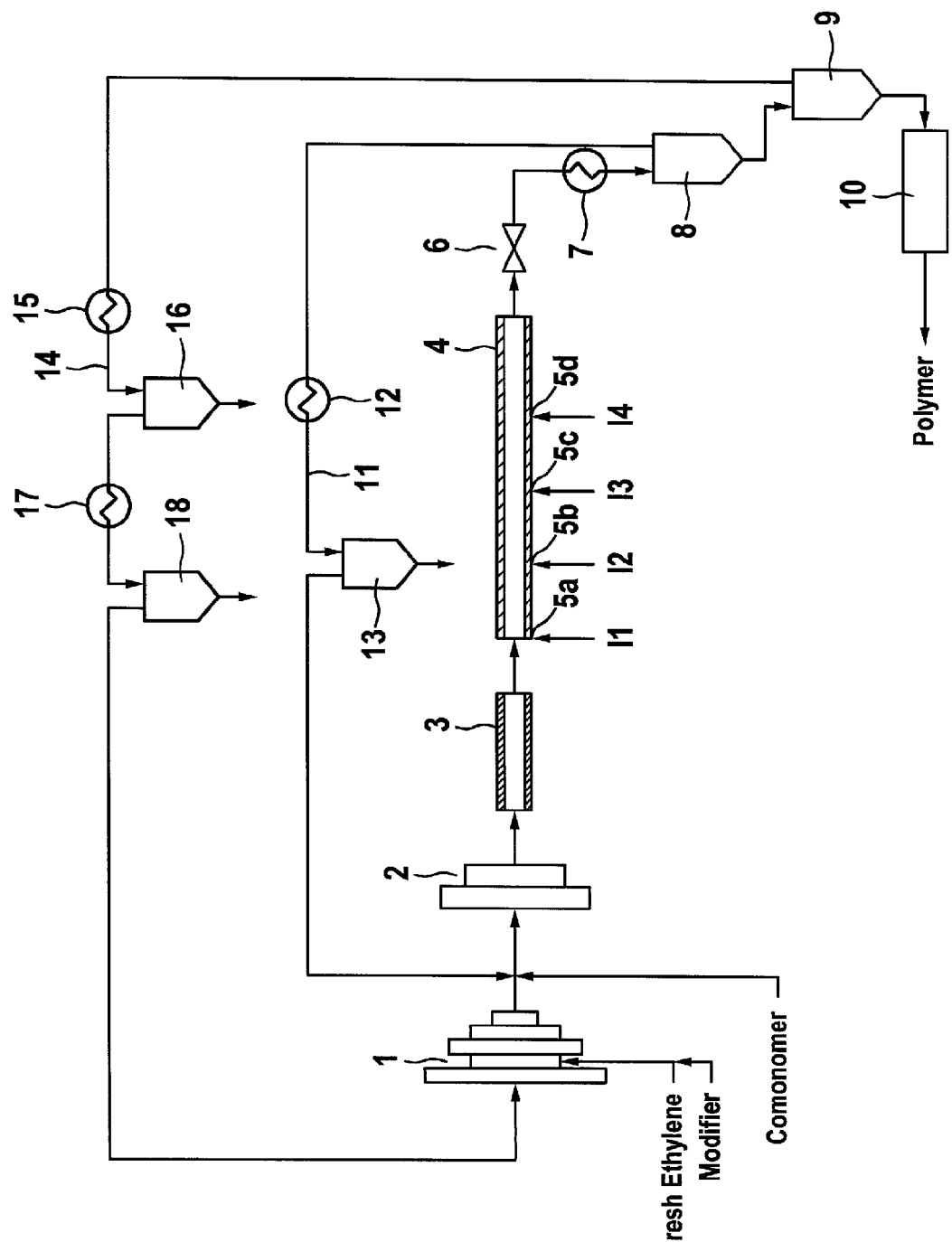
FIG. 1 shows schematically the set-up of a tubular polymerization reactor which can be used in the process of the present invention.

The process of the present invention is suitable for preparing ethylene copolymers. For the purposes of the present invention, polymers are all substances which are made up of at least two monomer units. They are preferably LDPE polymers having an average molecular weight $M_n$ of more than 20,000 g/mol. However, the method of the invention can also be advantageously employed in the preparation of oligomers, waxes and polymers having a molecular weight $M_n$ of less than 20,000 g/mol.

Possible initiators for starting the free-radical polymerization in the respective reaction zones are, for example, air, oxygen, azo compounds or peroxidic polymerization initiators. Initiation using organic peroxides or azo compounds represents a particularly preferred embodiment of the process of the invention. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert-butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethylhexanoyl-peroxy)hexane, tert-amyl peroxy-2-ethylhexanoate, dibenzoyl peroxide, tert-butyl peroxy-2 ethyl-hexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butyl-peroxy) cyclohexane, tert-butyl peroxyacetate, cumyl peroxyneodecanoate, tert-amyl peroxy-neodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert-butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators. A large range of initiators, in particular peroxides, are commercially available, for example the products of Akzo Nobel offered under the trade names Trigonox® or Perkadox®.

In a preferred embodiment of the process of the invention, peroxidic polymerization initiators having a relatively high decomposition temperature are used. Suitable peroxidic polymerization initiators include, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and particular preference is given to using di-tert-butyl peroxide.

The initiators can be employed individually or as a mixture in concentrations of from 0.1 to 50 mol/t of polyethylene produced, in particular from 0.2 to 20 mol/t, in each reaction zone. In a preferred embodiment of the present invention the free-radical polymerization initiator, which is fed to a reaction zone, is a mixture of at least two different azo compounds or organic peroxides.

If such initiator mixtures are used it is preferred that these are fed to all reaction zones. There is no limit for the number of different initiators in such a mixture, however preferably the mixtures are composed of from two to six and in particular of four or five different initiators. Particular preference is given to using mixtures of initiators which have different decomposition temperatures.

It is often advantageous to use the initiators in the dissolved state. Examples of suitable solvents are ketones and aliphatic hydrocarbons, in particular octane, decane and isododecane and also other saturated $C_8$-$C_{25}$-hydrocarbons. The solutions comprise the initiators or initiator mixtures in proportions of from 2 to 65% by weight, preferably from 5 to 40% by weight and particularly preferably from 10 to 30% by weight.

The reaction mixture generally comprises polyethylene in an amount in the range of from 0 to 45% by weight, based on the total monomer-polymer mixture, preferably from 0 to 35% by weight.

The process of the invention is carried out at pressures of from 160 MPa to 350 MPa, with pressures of from 180 MPa to 340 MPa being preferred and pressures of from 200 MPa to 330 MPa being particularly preferred. The temperatures are in the range from 100° C. to 350° C., preferably from 120° C. to 340° C. and very particularly preferably from 150° C. to 320° C.

The process of the present invention can be carried out with all types of tubular reactors suitable to high-pressure polymerization. Such reactors can have one or more reaction zones and have preferably from 2 to 6 reaction zones and particularly preferably from 3 to 5 reaction zones. The number of reaction zones is given by the number of injection points for the initiator. That means, in each reaction zone polymerization is initiated by addition of initiators which decompose into free radicals. Usually each reaction zone is followed by a zone of the tubular reactor in which cooling of the reaction mixture occurs. Preferred tubular reactors have a length-to-diameter ratio of greater than 1000, preferably from 10000 to 40000 and especially from 25000 to 35000. FIG. 1 shows a typical set-up for a suitable tubular polymerization reactor without however restricting the invention to the embodiments described therein.

The fresh ethylene, which is usually under a pressure of 1.7 MPa, is firstly compressed to a pressure of about 30 MPa by means of a primary compressor (1) and then compressed to the reaction pressure of about 300 MPa using a high pressure compressor (2). The molecular weight regulator is added to primary compressor (1). The reaction mixture leaving the high pressure compressor (2) is fed to pre-heater (3), where the reaction mixture is preheated to the reaction start temperature of from about 120° C. to 220° C., and then conveyed to the tubular reactor (4).

The tubular reactor (4) is basically a long, thick-walled pipe with cooling jackets to remove the liberated heat of reaction from the reaction mixture by means of a coolant circuit (not shown). It is usually from about 0.5 km to 4 km, preferably from 1.5 km to 3 km and especially from 2 km to 2.5 km long. The inner diameter of the pipe is usually in the range of from about 30 mm to 120 mm and preferably from 60 mm to 90 mm.

The tubular reactor (4) shown in FIG. 1 has four spatially separated initiator injection points (5a) to (5d) for feeding initiators or initiator mixtures 11 to 14 to the reactor and accordingly also four reaction zones. By feeding suitable free-radical initiators, which decompose at the temperature of the reaction mixture, to the tubular reactor the polymerization reaction starts. The generated heat of the reaction rises the temperature of the reaction mixture, since more heat is generated than can be removed through the walls of the tubular reactor. The rising temperature increases the rate of decomposition of the free-radical initiators and accelerates polymerization until all free-radical initiators are consumed. Thereafter no further heat is generated and the temperature decreases again since the temperature of the reactor walls is lower than that of the reaction mixture. Accordingly, the part of the tubular reactor downstream of an initiator injection point, in which the temperature rises, is the reaction zone, while the part thereafter, in which the temperature decreases again, is predominantly a cooling zone.

The amount and nature of added free-radical initiators determines how much the temperature rises and accordingly allows adjusting that value. Normally, the temperature rise in the first reaction zone is set to be in the range of from 70° C. to 170° C. and 50° C. to 130° C. for the subsequent reaction zones depending on the product specifications and reactor configuration. The reaction mixture leaves the tubular reactor (4) through a high-pressure let-down valve (6) and passes a post reactor cooler (7). Thereafter, the resulting polymer is separated off from unreacted ethylene and other low molecular weight compounds (monomers, oligomers, polymers, additives, solvent, etc) by means of a high-pressure separator (8) and a low-pressure separator (9), discharged and pelletized via an extruder and granulator (10).

The ethylene which has been separated off in the high-pressure separator (8) is fed back to the inlet end of the tube reactor (4) in the high-pressure circuit (11) at 30 MPa. It is first freed from other constituents in at least one purification stage and then added to the monomer stream between primary compressor (1) and high pressure compressor (2). FIG. 1 shows one purification stage consisting of a heat exchanger (12) and a separator (13). It is however also possible to use a plurality of purification stages. The high-pressure circuit (11) usually separates waxes.

The ethylene which has been separated off in the low-pressure separator (9), which further comprises, inter alia, the major part of the low molecular weight products of the polymerization (oligomers) and the solvent, is worked up in the low-pressure circuit (14) at a pressure of from about 0.1 to 0.4 MPa in a plurality of separators with a heat exchanger being located between each of the separators. FIG. 1 shows two purification stages consisting of heat exchangers (15) and (17) and separators (16) and (18). It is however also possible to use only one purification stages or preferably more than two purification stages. The low-pressure circuit (14) usually separates oil and waxes.

Different configurations for suitable tubular polymerization reactor are of course also possible. It can be advantageous to add the monomers not only at the inlet of the reactor tube but to feed them, preferably cooled, at a plurality of different points to the reactor. This is particularly preferably done at the beginning of further reaction zones and especially if oxygen or air is used as initiators, which is usually added to the monomer feed in the primary compressor.

In the process of the present invention ethylene is copolymerized with a bi- or multifunctional comonomer which bears at least two different functional groups. At least one of the functional groups is an unsaturated group, which can be incorporated into the growing polymer chain and qualifies the molecule as comonomer which can be copolymerized with ethylene, and at least another functional group can act as chain transfer agent in radical ethylene polymerization. If the bi- or multifunctional comonomer comprises two or more different unsaturated groups, which can be incorporated into the growing polymer chain, the probabilities of the groups of being incorporated into the growing chain differ because they have different chemical structure. Since according to the present invention at least one of the functional groups of the bi- or multifunctional comonomer can act as chain transfer agent, the bi- or multifunctional comonomer either comprises a further functional group which can act as chain transfer agent or one of the unsaturated groups, preferably one which has not the highest probability of being incorporated into the growing chain, can act as chain transfer agent.

The bi- or multifunctional comonomer has preferably a high reactivity in the free-radical polymerization, which leads to a nearly complete consumption of the bi- or multifunctional comonomer with introduction of the functional groups, which can act as chain transfer agent, into the LDPE chains. After having incorporated one of the bi- or multifunctional comonomers into the chain, the obtained polymer chain comprises at least one functional group which has an enhanced probability of reacting which free radicals of, for example, growing polymer chains and by this acts as chain transfer agent. As a consequence of such a reaction, a free radical at a position along the polymer chain is generated, which can then either start a further growing polymer chain or combine with another free radical such as another growing polymer chain. Consequently, the formation of an additional long-chain branching at previously obtained polymer chain is caused. Preferred bi- or multifunctional comonomers have a reactivity ratio in the copolymerization with ethylene at 200 MPa and 180° C. is in the range of from 0.1 to 500, preferred from 0.5 to 100, and most preferred from 0.9 to 50.

The different reaction modes and the different reactivities of the functional groups of the bi- or multifunctional comonomer also reduce the risk of forming gels in the produced LDPE. Because of their different reaction behavior, there is a high probability that the functional groups of the bi- or multifunctional comonomer react at different times and accordingly also at different places and there is consequently a lower risk that a fast reaction of unequally distributed comonomer results in cross-linking of the polymer chains and an increase of the gel level. It is thus possible to work with higher amounts of the bi- or multifunctional comonomer and obtaining a reduced gel level compared to a copolymerization with a bifunctional diene or a di- or multifunctional acrylate comonomer, which show an enhanced tendency for cross-linking polymer chains.

Preferably the functional group of the bi- or multifunctional comonomer, which has the highest probability of being incorporated into the growing chain, is an acrylate group, a methacrylate group, an amide group or a double bond and more preferably an acrylate group or a methacrylate group. Furthermore, the bi- or multifunctional comonomer comprises at least one functional group which can act as chain transfer agent in the free-radical polymerization. That functional group has preferably not the highest probability of the functional groups of the comonomer of being incorporated into the growing chain and is preferably an aldehyde group, a ketone group, an alcohol group, a thiol group or a double bond. The functional groups of the bi- or multifunctional comonomer are usually separated by a spacer group, which preferably separates the functional groups by at least one atom. Suitable spacer groups are for example composed of units —$CH_2$—, —$Si(CH_3)_2$—, —$CH_2$—O— and/or —$Si(CH_3)_2$—O— and comprise a chain of from 1 to 32, preferably from 1 to 22 and most preferably from 1 to 12 atoms.

The bi- or multifunctional comonomers of the present invention preferably are bifunctional and comprise one unsaturated group, which can be incorporated into the growing polymer chain, and another functional group, which ca act as chain transfer agent in radical ethylene polymerization. Preferred examples of such bifunctional comonomers are compounds of general formula (I)

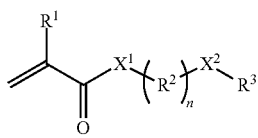

(I)

where the substituents and indices have the following meaning:

$R^1$ is methyl or hydrogen, $X^1$ is —O— or —NH—, preferably —O—, $R^2$ can be identical or different and is —Si(CH$_3$)$_2$—, —CH$_2$—O— or —Si(CH$_3$)$_2$—O—, and preferably all $R^2$ are —CH$_2$—, n is from 1 to 32, preferably from 1 to 22 and most preferably from 1 to 12, $X^2$ is —C(O)—, —CHOH— or —CHSH—, preferably —C(O)—, and $R^3$ is $C_1$-$C_{10}$-alkyl, preferably methyl, or hydrogen and especially preferred hydrogen, or the unit $X^2$—$R^3$ stands for —CH=CH$_2$.

Preferably the bi- or multifunctional comonomer is first mixed with ethylene before it is brought into contact with the free-radical polymerization initiator. The bi- or multifunctional comonomer is accordingly preferably added to the ethylene stream between primary and high pressure compressor. Such a mixture of ethylene and bi- or multifunctional comonomer can be fed only to the inlet of the tubular reactor. It is also possible to feed more than one stream of ethylene and bi- or multifunctional comonomer and feed accordingly one or more of these streams as side stream to the tubular reactor. It is however also possible to feed the bi- or multifunctional comonomer of the present invention as separate stream to the reactor, either at the inlet of the reactor and/or as side stream to one or more points along the reactor.

The process of the present invention is not only suitable for the copolymerization of ethylene and the bi- or multifunctional comonomer but also for the copolymerization of ethylene, the bi- or multifunctional comonomer and one or more further comonomers, which are free-radically copolymerizable with ethylene under high pressure. Examples of suitable further conomers are α,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and 1-olefins such as propene, 1-butene, 1-pentene, 1-hexene, 1-octene or 1-decene. In addition, vinyl carboxylates, particularly preferably vinyl acetate, can be used as comonomers. n-Butyl acrylate, acrylic acid or methacrylic acid are particularly advantageously used as comonomer. In the case of a copolymerization of ethylene, the bi- or multifunctional comonomer and further comonomers, the proportion of the further comonomer or the further comonomers in the reaction mixture is from 1 to 45% by weight, preferably from 3 to 30% by weight, based on the amount of all monomers, i.e. the sum of ethylene and all comonomers. Depending on the type of the further comonomer, it can be preferred to feed the further comonomers at a plurality of different points to the reactor.

In the process of the present invention, the molecular weight of the obtained ethylene copolymers is influenced by adding the bi- or multifunctional comonomer because it bears a functional group, which can act as chain transfer agent and accordingly terminates the further growth of growing polymer chains. However, preferably the molecular weight of the ethylene copolymers to be prepared is further altered by adding of additional chain transfers agents which are common in high-pressure polymerization. Examples of suitable additional chain transfers agents, sometimes also called modifiers, are hydrogen, aliphatic and olefinic hydrocarbons, e.g. pentane, hexane, cyclohexane, propene, 1-pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. Particular preference is given to using saturated aliphatic aldehydes, in particular propionaldehyde or 1-olefins such as propene or 1-hexene.

The present invention further refers to ethylene copolymers obtainable by the above-described process. These ethylene copolymers have a significantly increased content of long-chain branching compared to LDPE normally obtained from free-radical polymerization in tubular reactors. Because of their molecular structure they are especially suitable for being used in extrusion coating processes. They have superior melt stability during processing, i.e. high web-stability and low neck-in, and a potential of superior adhesion on the substrate such as such as paper, paperboard, polymeric film, or metal. Consequently the present invention also refers to the use of the ethylene copolymers for extrusion coating and to a process for extrusion coating a substrate selected from the group consisting of paper, paperboard, polymeric film, and metal, with these ethylene copolymers.

The invention is illustrated below with the aid of examples, without being restricted thereto.

EXAMPLES

Comparative Example A

Homopolymerization of ethylene

A simulation of a homopolymerization of ethylene in a high-pressure tubular reactor was carried out using the commercial polymerization modeling software PREDICI of Dr. Michael Wulkow Computing in Technology GmbH (CiT), Rastede, Germany. The kinetic data for the homopolymerization of ethylene were taken from M. Busch, Macromol. Theory Simul. 2001, 10, 408-429.

The reactor was assumed to be of the design shown in FIG. 1 with four initiator injection points having in total a length of 2000 m and a diameter of 76 mm. The calculation was carried based on the following assumptions:

ethylene throughput of the high pressure compressor 117 metric tons/h;

feed of propionaldehyde as chain transfer agent to the high pressure compressor 1.5 kg per ton of produced LDPE;

temperature of the ethylene feed at the reactor inlet 157° C.;

pressure at the reactor inlet 280 MPa feed of 0.3754 g/s of tert-butyl peroxy-3,5,5-trimethylhexanoate (TBPIN), 0.3610 g/s of di-tert-butyl peroxide (DTBP); 0.1506 g/s of tert-butyl peroxyneodecanoate (TBPND) and 0.3447 g/s of tert-butyl peroxypivalate (TBPP) reactor inlet feed of 0.0476 g/s of tert-butyl peroxy-3,5,5-trimethylhexanoate (TBPIN) and 0.3547 g/s of di-tert-butyl peroxide (DTBP) at a position 640 m downstream of the reactor inlet feed of 0.0521 g/s of tert-butyl peroxy-3,5,5-trimethylhexanoate (TBPIN) and 0.2951 g/s of di-tert-butyl peroxide (DTBP) at a position 1200 m downstream of the reactor inlet feed of 0.2797 g/s of di-tert-butyl peroxide (DTBP) at a position 1760 m downstream of reactor inlet.

The resulting data on long-chain branching, expressed as number of long-chain branches per 1000 carbon atoms, and on the molecular weight distribution of the obtained LDPE and the ethylene conversion are shown in Table 1. The calculated numbers of long-chain branches in the LDPE contained in the reaction mixture along the tubular reactor are further depicted in FIG. 2 and also listed in Table 2 for the positions 500 m, 1000 m, 1500 m and 2000 m downstream of the reactor inlet, i.e. after the first, the second, the third and the forth reaction zone. The calculated temperature profile along the tubular reactor is further shown in FIG. 3.

Example 1

Copolymerization of ethylene with acrylic acid 4-oxo-butyl ester

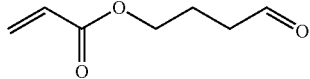

The simulation of Comparative Example A was repeated, however with additionally feeding acrylic acid 4-oxo-butyl ester in the amount indicated in Table 1 to the ethylene stream before entering the tubular reactor.

For kinetically characterizing the comonomer, it was assumed that the reactivity of the functional groups can be regarded independently. For describing the homopolymerization of the comonomer the kinetic data of n-butyl acrylate were used. For describing the copolymerization of ethylene and the comonomer, data for the copolymerization of methyl acrylate and ethylene were taken.

Figure 2:
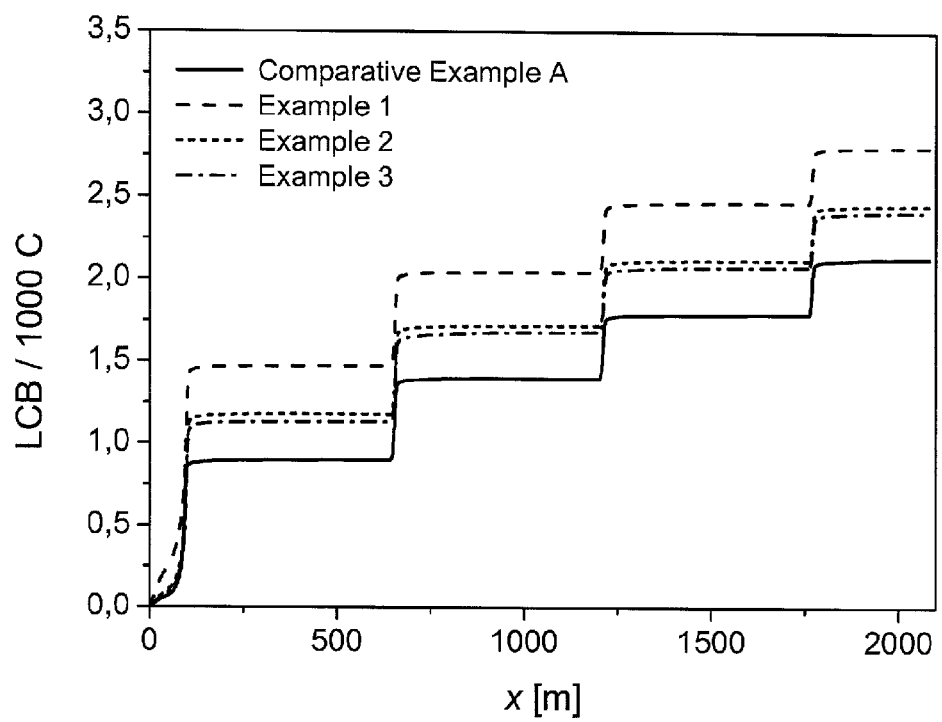
FIG. 2 depicts the amount of long-chain branches of the LDPE contained in the reaction mixture along the tubular reactor for some polymerizations described in the examples and FIG. 3 shows the temperature profiles along the tubular reactor for these examples.
Figure 3:
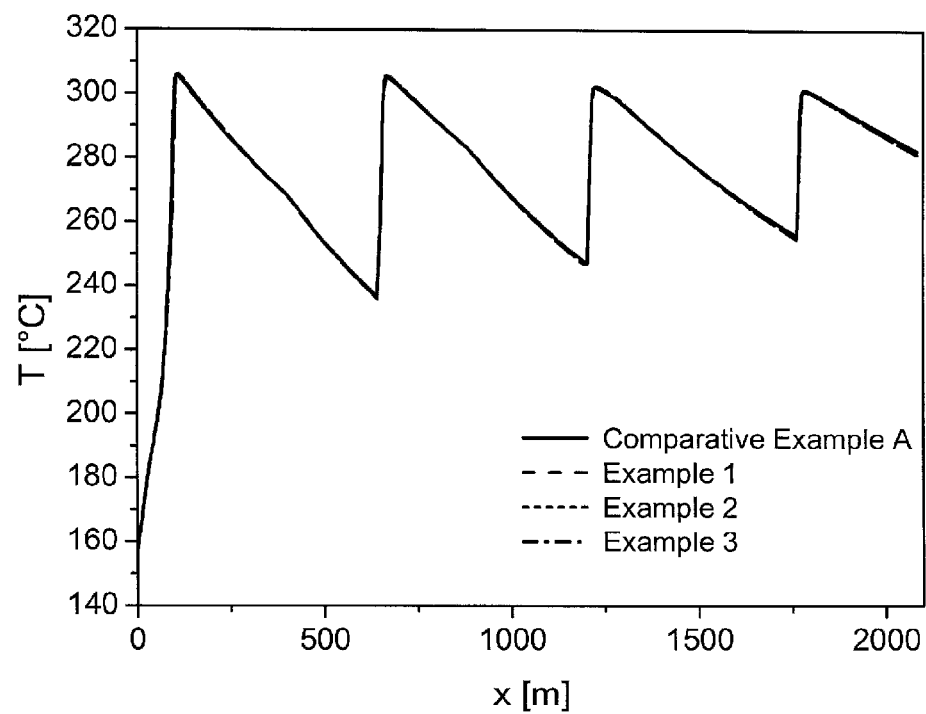

The resulting data on long-chain branching and on the molecular weight distribution of the obtained LDPE and the ethylene conversion are shown in Table 1. The numbers of long-chain branches in the LDPE contained in the reaction mixture along the tubular reactor are depicted in FIG. 2 and in Table 2 and the temperature profile is shown in FIG. 3.

Example 2

Copolymerization of ethylene with acrylic acid 2-oxo-propyl ester

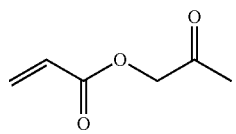

A simulation as in Example 1 was carried out, however with feeding acrylic acid 2-oxo-propyl ester in the amount indicated in Table 1 to the ethylene stream before entering the tubular reactor.

The resulting data on long-chain branching and on the molecular weight distribution of the obtained LDPE and the ethylene conversion are shown in Table 1. The numbers of long-chain branches in the LDPE contained in the reaction mixture along the tubular reactor are depicted in FIG. 2 and in Table 2 and the temperature profile is shown in FIG. 3.

Example 3

Copolymerization of ethylene with acrylic acid 2-hydroxy-propyl ester

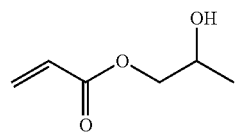

A simulation as in Example 1 was carried out, however with feeding acrylic acid 2-hydroxy-propyl ester in the amount indicated in Table 1 to the ethylene stream before entering the tubular reactor.

The resulting data on long-chain branching and on the molecular weight distribution of the obtained LDPE and the ethylene conversion are shown in Table 1. The numbers of long-chain branches in the LDPE contained in the reaction mixture along the tubular reactor are depicted in FIG. 2 and in Table 2 and the temperature profile is shown in FIG. 3.

Comparative Example B and C

Copolymerization of ethylene with 1,4-butanedioldiacrylate

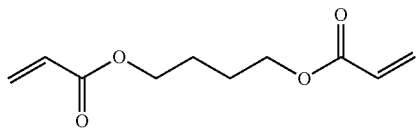

A simulation as in Example 1 was carried out, however with feeding 1,4-butanedioldiacrylate in the amounts indicated in Table 1 to the ethylene stream before entering the tubular reactor.

The resulting data on long-chain branching and on the molecular weight distribution of the obtained LDPE and the ethylene conversion are shown in Table 1.

The resulting data on long-chain branching and molecular weight distribution of the obtained ethylene copolymers and the ethylene conversion are depicted in Table 1.

TABLE 1

| Example/ Comparative Example | Amount of comonomer [mol-%] | LCB/ 1000 C | $M_n$ [g/mol] | $M_w$ [g/mol] | $M_z$ [g/mol] | $M_w/M_z$ | conversion [%] |
|---|---|---|---|---|---|---|---|
| A | 0 | 2.1 | 14,305 | 79,980 | 185,071 | 5.6 | 29.9 |
| 1 | 0.23 | 2.8 | 12,907 | 70,123 | 161,752 | 5.4 | 30.4 |
| 2 | 0.23 | 2.5 | 13,951 | 75,345 | 170,892 | 5.4 | 31.1 |
| 3 | 0.24 | 2.4 | 14,082 | 75,345 | 170,892 | 5.4 | 31.4 |
| B | 0.0013 | 2.1 | 14,792 | 101,834 | 275,170 | 6.7 | 30.7 |
| C | 0.004 | 2.2 | 15,494 | 163,349 | 538,236 | 11.0 | 30.8 |

TABLE 2

| Example/ Comparative Example | LCB/ 1000 C at 500 m | LCB/ 1000 C at 1000 m | LCB/ 1000 C at 1500 m | LCB/ 1000 C at 2000 m |
|---|---|---|---|---|
| A | 0.90 | 1.40 | 1.79 | 2.12 |
| 1 | 1.47 | 2.04 | 2.46 | 2.80 |
| 2 | 1.18 | 1.72 | 2.11 | 2.45 |
| 3 | 1.13 | 1.68 | 2.07 | 2.41 |

The comparison of Examples 1, 2 and 3 with Comparative Example A shows that addition of different bifunctional comonomers to the reaction mixture along the tubular reactor leads to an increase of long chain branching and therefore to a better processing performance. All these comonomers cause a significant increase of LCB. This can also be seen from FIG. 1, which shows the amount of LCB/1000 C along the tube. On the other hand no impact on the molecular weight distribution was observed.

By contrast, as can be seen from Comparative Examples B and D, the addition of a diacrylate comonomer with similar reactivity of the functional groups has no impact on the amount of long-chain branching, only broadening of the molecular weight distribution with increasing amount of diacrylate comonomer was observed. Moreover, an increased amount of cross-links (0.031/1000 C and 0.057/1000 C), i.e. a linkage to two polymer chains, was found, indicating an increased gel level.

The invention claimed is:

1. A process for preparing ethylene copolymers in the presence of free-radical polymerization initiator at pressures in the range of from 160 MPa to 350 MPa and temperatures in the range of from 100° C. to 350° C. in a tubular reactor by copolymerizing ethylene, a bi- or multifunctional comonomer and optionally further comonomers, wherein the bi- or multifunctional comonomer has a structure represented by general formula (I):

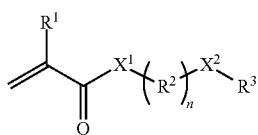

(I)

wherein $R^1$ is methyl or hydrogen, $X^1$ is —O— or —NH—, $R^2$ each $R^2$ can be identical or different and is selected from —Si(CH$_3$)$_2$—, —CH$_2$—O— or —Si(CH$_3$)$_2$—O—, n is from 1 to 32, $X^2$ is —C(O)—, —CHOH— or —CHSH—, and $R^3$ is $C_1$-$C_{10}$-alkyl or hydrogen, or the unit $X^2$—$R^3$ stands for —CH=CH$_2$, wherein the bi- or multi-functional comonomer bears at least two different functional groups, of which at least one is an unsaturated group and at least another functional group can act as chain transfer agent in radical ethylene polymerization.

2. A process according to claim 1, wherein a reactivity ratio of the bi- or multifunctional comonomer in the copolymerization with ethylene at 200 MPa and 180° C. is in the range of 0.1 to 500.

3. A process according to claim 1, wherein the unsaturated group is an acrylate group, a methacrylate group or a double bond.

4. A process according to claim 1, wherein the functional group that can act as a chain transfer agent is an aldehyde group, a ketone group, an alcohol group, a thiol group or a double bond.

5. A process according to claim 1, wherein the bi- or multi-functional comonomer is acrylic acid 4 oxo-butyl ester, methacrylic acid 4-oxo-butyl ester, acrylic acid 2-oxo-propyl ester, methacrylic acid 2-oxo-propyl ester, acrylic acid 2-oxo-propyl ester or methacrylic acid 2 oxo-propyl ester.

6. A process according to claim 1, wherein the free-radical polymerization initiator is added to a mixture comprising ethylene and the bi- or multifunctional comonomer.

7. The process of claim 1, further comprising the step of preparing an article comprising the ethylene copolymer.

8. The process of claim 7, wherein the article is prepared by the process of extrusion coating.

9. The process of claim 8, wherein during the process of extrusion coating a substrate is coated with the ethylene copolymer wherein the substrate is selected from the group consisting of paper, paperboard, polymeric film, and metal.

* * * * *